United States Patent
Woehlke et al.

(10) Patent No.: US 7,188,416 B1
(45) Date of Patent: Mar. 13, 2007

(54) RESTORATION PROCESS FOR POROSITY DEFECTS IN HIGH PRESSURE DIE CAST ENGINE BLOCKS

(75) Inventors: Douglas M. Woehlke, Fond du Lac, WI (US); Raymond J. Donahue, Fond du Lac, WI (US); Kevin R. Anderson, Fond du Lac, WI (US)

(73) Assignee: Brunswick Corporation, Fond du Lac, WI (US)

( * ) Notice: Subject to any disclaimer, the term of this patent is extended or adjusted under 35 U.S.C. 154(b) by 403 days.

(21) Appl. No.: 10/358,480

(22) Filed: Feb. 5, 2003

(51) Int. Cl.
*B23P 6/00* (2006.01)

(52) U.S. Cl. .............. 29/888.011; 29/402.09; 29/402.11; 29/402.16

(58) Field of Classification Search ........... 29/888.011, 29/402.09, 402.11, 402.16
See application file for complete search history.

(56) References Cited

U.S. PATENT DOCUMENTS

| | | | | |
|---|---|---|---|---|
| 2,588,421 | A | * | 3/1952 | Shepard ................ 427/404 |
| 4,878,953 | A | * | 11/1989 | Saltzman et al. ........... 148/512 |
| 5,071,054 | A | * | 12/1991 | Dzugan et al. ............. 228/119 |
| 5,626,674 | A | * | 5/1997 | VanKuiken et al. ........ 118/317 |
| 5,766,693 | A | * | 6/1998 | Rao ........................ 427/454 |
| 6,049,978 | A | * | 4/2000 | Arnold ..................... 29/889.1 |
| 6,060,117 | A | * | 5/2000 | Pergande et al. ........... 427/224 |
| 6,395,090 | B1 | * | 5/2002 | Shepley et al. .............. 118/504 |
| 2003/0088980 | A1 | * | 5/2003 | Arnold ..................... 29/889.1 |

FOREIGN PATENT DOCUMENTS

| | | | |
|---|---|---|---|
| DE | 2613669 | * | 10/1977 |
| JP | 09-09757 | * | 1/1997 |
| JP | 11-158598 | * | 6/1999 |
| JP | 2002-309999 | * | 10/2002 |

OTHER PUBLICATIONS

JPO Machine Translation of JP 2002-309999 (AZUMA).*

* cited by examiner

*Primary Examiner*—Marc Jimenez
(74) *Attorney, Agent, or Firm*—Andrus, Sceales, Starke & Sawall, LLP

(57) ABSTRACT

A restoration process for restoring surface porosity defects in engine blocks cast using a high pressure die cast method. The areas of an engine block having surface porosity defects are identified and the areas not containing surface porosity defects are masked using an adhesive, reusable, rubberized mask. The masked surface is subsequently cleaned and a metal spray is applied to the surface porosity defects. The mask is removed and the restored surface porosity defects are hand finished to create an engine block having less than 0.05% surface porosity.

14 Claims, 2 Drawing Sheets

RESTORATION PROCESS FOR POROSITY DEFECTS IN HIGH PRESSURE DIE CAST ENGINE BLOCKS

BACKGROUND AND SUMMARY OF THE INVENTION

High pressure die casting (HPDC) of engine blocks is well known in the industry. However, the HPDC process inherently yields a higher level of porosity then other metal mold casting processes, such as, low pressure die casting, squeeze casting, or semi-solid metal casting (SSM). While these other casting processes require a much higher manufacturing cost, they are often preferred over the HPDC process as the cost of repairing surface porosity defects in engine blocks offsets the low cost of the HPDC process.

The high pressure die cast process produces products with a typical porosity of 0.5 percent. Such a porosity level yields a significant amount of surface porosity defects which prevent the use of the high pressure die cast process in certain instances, especially with respect to the casting of engine blocks. For example, such surface porosity defects are not adequate for a four stroke engine block comprised of an all aluminum or hypereutectic aluminum silicon alloy that must use less than one quart of oil per 6,000 miles. In this instance, the surface porosity allows oil to penetrate past the piston ring causing "oil burning".

The 0.5 percent porosity level is also inadequate for high pressure die cast engine blocks comprised of a hypoeutectic aluminum silicon alloy requiring chrome plating of the bores. In fact, it has been found that it is nearly impossible to chrome plate over high pressure die cast surface porosities and still have a durable chrome bore that will perform for 100,000 miles.

Further, it has been found that the O-ring seal between the combustion chamber and the water cooling chamber of an internal combustion engine is not adequately sealed if there is the typical 0.5 percent porosity resulting from the high pressure die cast process on the head deck of an engine block. This is due to the fact that the surface porosities interface with the O-ring seal. Even surface porosities as small as 0.010 inches in diameter may cause inadequate sealing.

Surprisingly, it has been found that the surface porosity problem may be remedied by a highly efficient restoration process that eliminates surface porosity on an exposed machined surface. The restoration process of the present invention allows the use of high pressure die casting in applications formerly thought to be not economically amenable to the high pressure die cast process and is superior to the restoration processes that currently define the state of the art.

In the current state of the art, surface porosity repair is achieved through the use of polymer matrix repair putty such as Devcon®, or the like. This approach to the repair of surface porosities is termed the "putty solution." The disadvantage of the use of polymer matrix repair putty is that it may not be used on surface porosity smaller than 0.080 inches in diameter. As proper O-ring sealing requires elimination of surface porosities as small as 0.010 inches in diameter, the putty solution is an imperfect restoration process.

In order to remedy the deficiencies in the putty solution, surface porosities between 0.010 inches and 0.080 inches are drilled out so that they reach the 0.080 inch requirement and are subsequently filled with the polymer matrix repair putty. Still, the solution is imperfect as the drilling increases the surface porosity before the Devcon® repair putty is able to effectively fill the porosity with a sufficient bonding patch. The drilling step also requires the use of additional resources making the process less efficient. Additionally, the patch is not aesthestically pleasing to consumers and may convey a message that the blocks are substandard. Further, although long term life of polymer matrix repair putty patches themselves are presumed acceptable, it does decrease heat transfer locally and the long term interaction with the aluminum interfaces are in question.

Another drawback of the putty solution is that manufacturing restrictions only allow three polymer matrix repair putty patches per engine block. Only allowing three repair patches is challenging when taken in combination with high pressure die casting. The HPDC process in conjunction with the putty solution still may result in rejection rates ranging between 5 percent and 50 percent. This range of rejection rates completely disturbs plant efficiencies and productivity. The putty solution further complicates plant productivity efficiencies insofar as the putty requires curing for 24 hours before final finishing of the engine block surface. Therefore, a combination of the high pressure die cast process along with the putty solution requires a significant que for an engine block line that requires continuous seven day production to keep up with a five day demand.

An additional secondary operation utilized in the current state of the art is the use of a metal soldering patch in replacement of the polymer matrix repair putty. This "soldering solution" requires the application of a low melting point alloy on top of the identified surface porosity. Conceptually, this solution has three main advantages: 1) the patch would not be visible after cleanup; 2) it could be utilized on more than three repair sites per engine block head deck; and 3) it would not require any curing time between application and finishing, thus eliminating the need for a que of blocks.

However, the soldering solution has a major drawback in that a Galvanic couple exists between the dissimilar base metal and soldering patch. The Galvanic couple is problematic when it comes into contact with salt water, because salt water corrodes the soldering patch. As many of the engine blocks produced by this process are for marine applications, and specifically for salt water marine applications, such a problem is quite disadvantageous. Further, the soldering solution requires a heat input to the engine block surface which may result in heat distortion defects, discoloration, and overaging of the precipitation strengthened aluminum engine blocks.

As a result of the concerns about the putty solution as well as the soldering solution, alternative solutions have been explored. Surprisingly, a metal spraying restoration process captures the three noted advantages of the soldering solution without having a bonding problem, a Galvanic corrosion problem, nor a heat input problem. This novel restoration process efficiently and economically restores for use high pressure die cast engine blocks having surface porosity defects revealed by machining of the blocks. The restoration process of the current invention provides a better bond with an aluminum silicon substrate surface than either the polymer matrix repair putty or the solder material. The use of aluminum oxide grit blasting in the process further substantiates the bond. Further, there is no need to make smaller porosity defects "bigger" for applying the metal spray nor is there a limit to the number or size of porosity defects that may be repaired. Further, there is no heat distortion imparted to the engine blocks nor do Galvonic corrosion concerns exist because the spray metal applied is very similar to the substrate metal. As a result of these advantages, there is significantly less scrapping, resulting in a much more efficient production process. The restoration process of the current invention also does not require any waiting or curing time between the application of the restoration process and the final finishing of the block. Thus, no production que is needed and level loading of the blocks may be planned through the production and machining process, further increasing the efficiency of production compared to the putty solution or the soldering solution. Finally, the aesthetic problem associated with the putty solution is eliminated as repaired porosity defects are not visible after clean up.

Metal spraying ceramic materials for wear resistance has been commercialized in the enhancement of crank pin journals, as well as in metal spraying of complete cylinder bores. However, neither of the above stated uses of metal spraying have been contemplated for the restoration of surface porosity defects.

Crank pin journals are defined as the area where a connecting rod attaches to a crankshaft in an engine. The use of metal spray enhances the durability of crank pen journals to wear by building up the area of attachment. Similarly, the aircraft industry has used metal spraying of complete cylinder bores to produce a coating that reduces wear problems.

With the metal spraying being utilized to create a wear surface, the noted processes require a large capitalized systems approach. This is significantly different from the restoration of miniscule surface porosity defects to allow the use of the high pressure die casting process. Further, the process of the current invention is also quite different from any "rapid prototyping" process that builds entire articles, for the same reasons already cited. The use of this microarea, restoration process to add value to the high pressure die cast process therefore is a new and significantly useful addition to the state of the art.

BRIEF DESCRIPTION OF THE DRAWINGS

The drawings illustrate the best mode presently contemplated of carrying out the invention.

In the drawings.

DETAILED DESCRIPTION OF THE PREFERRED EMBODIMENT

Figure 1:
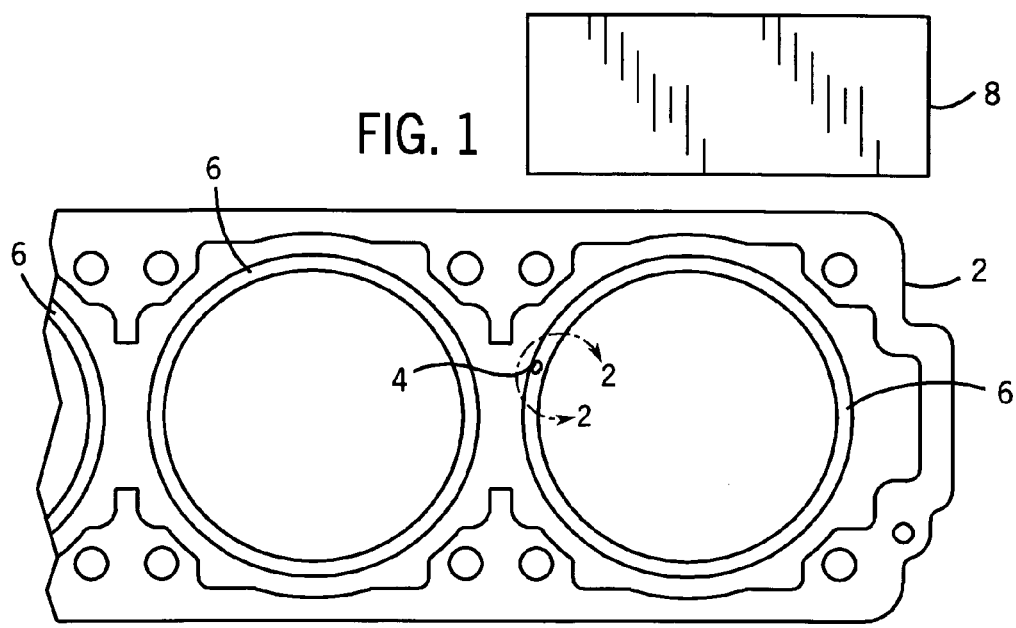
FIG. 1 is a partial top view of a head deck of an engine block and of a mask material.
Figure 2:
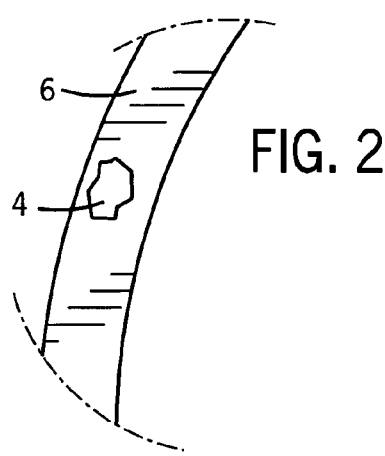
FIG. 2 is a magnified view of a cylinder bore of a head deck of an engine block demonstrating a surface porosity defect and taken along line 2—2 of FIG. 1.

The restoration process for repairing surface porosity defects in the cylinder bores of engine blocks cast using the high pressure die cast method is disclosed herein. Referring to FIG. 1, an engine block 2 is cast using a high pressure die cast (HPDC) casting method. The HPDC method is a highly economical casting method that inherently yields a number of surface porosity defects in the final cast article. Such defects are revealed when the final cast article, such as the engine block 2, is machined subsequent to casting. Surface porosity defects 4 result from the entrapment of air, inadequate feeding, shrinkage or precipitation of hydrogen during the cooling of the alloy used to form the engine block 2.

Surface porosity defects 4 are particularly undesirable on or in cylinder bore 6 of the engine block 2. Such defects may cause excess oil consumption, create problems in coating the cylinder bores and/or create problems with piston ring or gasket sealing.

Figure 3:
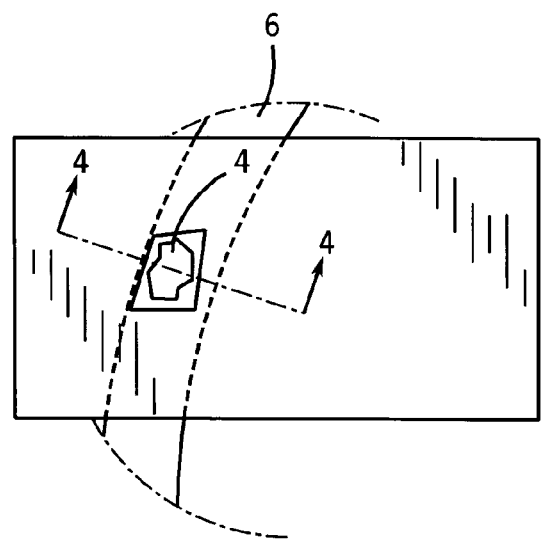
FIG. 3 is a magnified view similar to FIG. 2 illustrating the application of a mask to surround a surface porosity defect.
Figure 4:
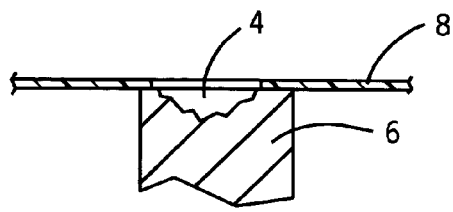
FIG. 4 is a section view taken along line 4—4 of FIG. 3.

Once the surface porosity defects 4 are located and identified, a mask 8 is obtained. The mask 8 is cut in a manner such that the mask covers the cylinder bore 6 yet leaves an opening where the surface porosity defect 4 is located. As demonstrated in FIGS. 3 and 4, the mask 8 is of sufficient size to cover the areas of the cylinder bore not requiring restoration, yet contains sufficient openings to reveal the surface porosity defects.

The mask 8 is a reusable, adhesive backed, rubberized mask with holes cut corresponding to the size of the surface porosity defects 4. The mask may be a high tech stencil mask available from Anchor Continental, Inc. of Columbia, S.C., or a similar material.

After the mask 8 is arranged over the surface porosity defect 4, the engine block 2 is cleaned. Cleaning is preferably done by placing the engine block in a blasting cabinet. The blasting cabinet cleans the surface porosity defect 4 using a grit blasting method, such as aluminum oxide grit blasting, or the like. The grit blasting removes excess debris in the surface porosity defect 4, leaving the defect 4 in proper condition for restoration. The blasting cabinet utilized may be a Zero brand blasting product available from Clemco Industries Corporation of Washington, Md., or it may be comparable to such a device. The grit blasting process is cycled according to the specifications of the blasting cabinet. After the engine block 2 and surface porosity defects 4 are cleaned, the engine block 2 is removed from the blasting cabinet.

Figure 5:
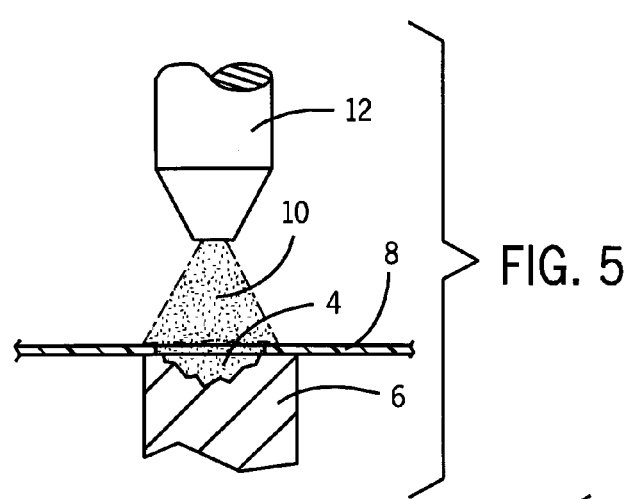
FIG. 5 is a side view similar to FIG. 4 demonstrating the application of a metal spray to a surface porosity defect.

Referring now to FIG. 5, after the surface porosity defect 4 is cleaned, a metal spray 10 is applied to restore the surface porosity defect 4. The metal spray 10 is preferably applied using a spray gun 12 containing the metal spray 10. The metal spray 10 may be of the same type of metal as the surface metal of the cylinder bore 6. During application of the metal spray 10, the mask 8 acts to shield the areas of the cylinder bore 6 not requiring restoration from excess buildup of the metal spray 10.

A metal spray gun that may be used in the process of the current invention is available from Praxair, Inc. of Danbury, Conn. The Praxair thermo spray systems for applying metal spray utilize Praxair thermal spray wires as the source for the metal spray. The metal spray gun heats the wires to an appropriate temperature and then sprays the metal at the elevated temperature in order to provide a strong bond between the substrate material (such as the cylinder bore 6) and the metal spray 10. Other metal spray systems other than the Praxair thermal spray systems are contemplated to be within the scope of the present invention.

The metal spray 10 is generally comprised of a material similar to the substrate metal. Preferably, the metal spray is an aluminum silicon alloy having at least 4% silicon by weight.

Figure 6:
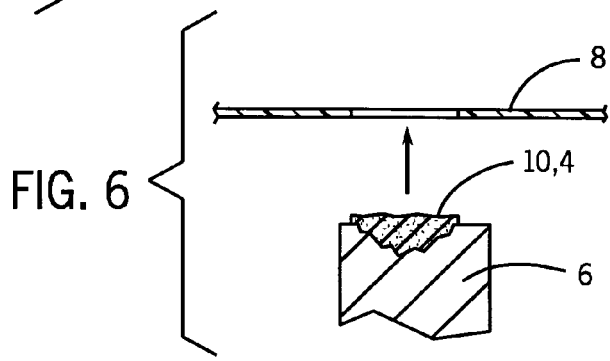
FIG. 6 is a side view similar to FIGS. 4 and 5 demonstrating removal of a mask from a restored surface porosity defect.

Referring now to FIG. 6, after a sufficient amount of the metal spray 10 is applied to the surface porosity defect 4, the mask 8 is removed. In that time, the metal spray 10 sufficiently solidifies to provide a bonded restoration of the surface porosity defect 4.

Figure 7:
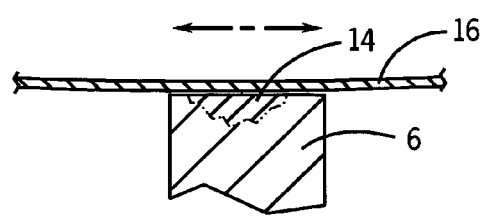
FIG. 7 is a side view similar to FIGS. 4–6 illustrating the finishing of a restored surface porosity defect.
Figure 8:
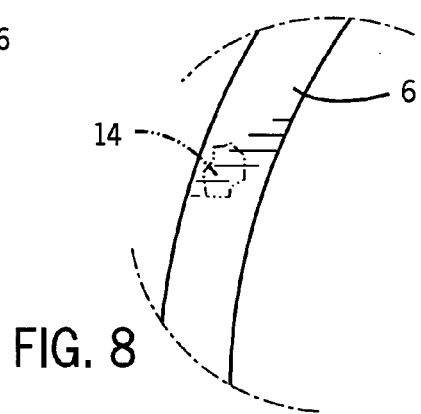
FIG. 8 is a magnified view similar to FIGS. 2 and 3 illustrating a cylinder bore having a restored surface porosity defect.

Referring now to FIG. 7, after the mask 8 is removed, and the metal spray 10 is sufficiently hardened, the restored surface porosity defect 14 is finished. The finishing step may be done using an abrasive manual finishing tool 16. The manual abrasive finishing tool may be a file, abrasive paper or a similar tool. Alternatively, a mechanized abrasive finishing tool may be used. However, the use of mechanized abrasive tools is cautioned against as inattentive use of such tools may cause excessive grinding on the cylinder bore 6. The restored surface porosity defect 14 is finished in a manner such that the surface is indistinguishable from the surface of the cylinder bore 6, as demonstrated in FIG. 8.

The current process allows for the manufacturing of engine blocks having less than 0.05% of surface porosity in the cylinder bores of such engine blocks. Further, the process of the present invention may be used in many applications requiring the restoration of surface porosity defects. For example, the process may be used in the restoration of surface porosity defects wherein the engine block 2 is formed from any number of Aluminum Association alloys including, but not limited to, aluminum association alloy Nos.: 360, 361, 364, 369, 380, 383, 384, 385, 390, 391 and 392. Additionally, the engine block 2 may be formed from Mercalloy XK 360. In such cases, the metal spray 10 that is utilized should be of sufficient similarity to the substrate metal in order to provide a quality bond.

Further, the process of the present invention may be used to restore a surface between a combustion chamber and a water cooling chamber of an engine block comprised of the above mentioned materials having surface porosity defects greater than 0.0080 inches in diameter. Such restoration allows the proper O-ring sealing between the combustion chamber and water cooling chamber in accordance with industry standards. Additionally, the process of the current invention may be utilized to produce a surface that allows for chrome plating of the cylinder bores and may also be used to produce cylinder bores being sufficiently free of surface porosity defects such that a four stroke engine block manufactured by the current process uses less than one quart of oil per every 6,000 miles.

The above description describes what is believed to be the preferred embodiments of the present invention. However, those skilled in the art will recognize that other and further changes and modifications may be made thereto without departing from the spirit and scope of the invention, and it is intended to claim all such changes and modifications which fall within the true scope of the invention.

What is claimed is:

1. A restoration process for repairing surface porosity defects in high pressure die cast engine blocks resulting from the die casting process comprising the steps of: identifying an area in a surface containing at least one porosity defect resulting from the die casting process, the area defining a restoration area; masking an area adjacent to said restoration area with a mask; using a grit blasting process to clean the said restoration area; applying a metal spray to said restoration area; removing the mask from the area adjacent said restoration area; and finishing the restoration area.

2. The process of claim 1, wherein the step of masking an area adjacent said restoration area further comprises the step of masking the area adjacent to said restoration area with a reusable, adhesive backed, rubberized mask, having holes therein corresponding to the areas of restoration.

3. The process of claim 1, wherein the step of using a grit blasting process to clean the restoration area further comprises placing the masked engine block in a blasting cabinet; and the grit blasting process comprises an aluminum oxide grit blasting process.

4. The process of claim 1, wherein the step of applying a metal spray further comprises applying the spray with a spray gun containing a metal spray of the same type of metal as the surface metal.

5. The process of claim 1, wherein the step of finishing the restoration area further comprises manually finishing the restoration area with an abrasive finishing tool or an abrasive paper.

6. The process of claim 1, wherein said engine blocks are formed of an Aluminum Association alloy from the group consisting of: 360, 361, 364, 369, 380, 383, 384, 385, 390, 391, 392.

7. The process of claim 1, wherein said engine blocks are formed of Mercalloy XK360.

8. The process of claim 1, wherein the process further comprises a step of cutting holes in a mask, said holes corresponding to the size and shape of the porosity defect, after the step of identifying a restoration area and prior to the step of masking an area adjacent to said restoration area.

9. The process of claim 1 wherein said engine block is cast utilizing a lost foam or sand cast process.

10. A restoration process for repairing surface porosity defects in high pressure die cast engine blocks after machining, the process comprising the steps of: identifying areas of restoration in a surface containing surface porosity defects, the defects being a result of the die casting process; masking areas in the surface not requiring restoration with a reusable, adhesive backed, rubberized mask, having holes therein corresponding to the areas of restoration; placing the masked engine block in a blasting cabinet; cleaning the areas of restoration exposed through the mask with an aluminum oxide grit blasting method to remove excess debris in the areas of restoration; applying a metal spray to the areas in a surface containing surface porosity defects, wherein the application is done manually with metal spray guns and the spray metal comprises an Aluminum-Silicon alloy having at least 4% Silicon by weight; removing the mask from the surface; and finishing the surface, wherein the finishing is done manually.

11. The process of claim 10, wherein said engine blocks are formed of an Aluminum Association alloy from the group consisting of: 360, 361, 364, 369, 380, 383, 384, 385, 390, 391, 392.

12. The process of claim 10, wherein said engine blocks are formed of Mercalloy XK360.

13. The process of claim 10, wherein the process further comprises a step of cutting holes in a mask, said holes corresponding to the size and shape of said porosity defect, after the step of identifying areas of restoration and prior to the step of masking areas not requiring restoration.

14. The process of claim 10, wherein said engine block is cast utilizing a lost foam or sand cast process.

* * * * *